US011143606B2

United States Patent
Hashizume et al.

(10) Patent No.: US 11,143,606 B2
(45) Date of Patent: Oct. 12, 2021

(54) PARTICLE MEASURING DEVICE AND PARTICLE MEASURING METHOD

(71) Applicant: Hitachi High-Tech Corporation, Tokyo (JP)

(72) Inventors: Tomihiro Hashizume, Tokyo (JP); Masatoshi Yasutake, Tokyo (JP); Tsunenori Nomaguchi, Tokyo (JP); Takafumi Miwa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 0 days.

(21) Appl. No.: 16/965,228

(22) PCT Filed: Feb. 1, 2018

(86) PCT No.: PCT/JP2018/003409
§ 371 (c)(1),
(2) Date: Jul. 27, 2020

(87) PCT Pub. No.: WO2019/150524
PCT Pub. Date: Aug. 8, 2019

(65) Prior Publication Data
US 2020/0371050 A1    Nov. 26, 2020

(51) Int. Cl.
*G01N 23/2252* (2018.01)
*G01N 23/2208* (2018.01)
*G01N 21/95* (2006.01)
*G01N 15/02* (2006.01)
(Continued)

(52) U.S. Cl.
CPC ......... *G01N 23/2252* (2013.01); *G01N 15/02* (2013.01); *G01N 15/1012* (2013.01);
(Continued)

(58) Field of Classification Search
CPC .......... G01N 23/2252; G01N 23/2251; G01N 23/2208; G01N 15/1468; G01N 15/1012;
(Continued)

(56) References Cited

U.S. PATENT DOCUMENTS

2006/0113469 A1    6/2006  Baba et al.
2009/0041334 A1    2/2009  Nagano
(Continued)

FOREIGN PATENT DOCUMENTS

JP    S62238439 A    10/1987
JP    H08304426 A    11/1996
(Continued)

OTHER PUBLICATIONS

Search Report dated Apr. 24, 2018 in corresponding International No. PCT/JP2018/003409.

*Primary Examiner* — Kiet T Nguyen
(74) *Attorney, Agent, or Firm* — Miles & Stockbridge, P.C.

(57) ABSTRACT

To enable evaluation of a shape of a fine particle and a fine particle type, a substrate is set as a substrate on which an isolated fine particle to be measured and an isolated standard fine particle in the vicinity of the isolated fine particle to be measured are disposed, and a scanning electron microscope body including a detector configured to detect secondary charged particles obtained by scanning a surface of the substrate with an electron beam probe, and a computer that processes a detection signal and generates an image of the isolated fine particle to be measured and the isolated standard fine particle are provided. The computer corrects a shape of the isolated fine particle to be measured by using a measurement result of the isolated standard fine particle disposed in the vicinity of the isolated fine particle to be measured. Further, by attaching a fine particle spreading tank equipped with a fine particle suspension dropping device inside the microscope body, automatic measurement including dropping of fine particle suspension onto a surface of a surface-modified substrate is possible.

15 Claims, 13 Drawing Sheets

(51) Int. Cl.
*G01N 15/10* (2006.01)
*G01N 23/2251* (2018.01)

(52) U.S. Cl.
CPC ......... *G01N 21/95* (2013.01); *G01N 23/2208* (2013.01); *G01N 23/2251* (2013.01); *G01N 2015/0294* (2013.01); *G01N 2015/1093* (2013.01); *G01N 2223/079* (2013.01); *G01N 2223/426* (2013.01)

(58) Field of Classification Search
CPC ........... G01N 15/02; G01N 2015/0038; G01N 2015/0294; G01N 2015/1093; G01N 2223/641; G01N 2223/079; G01N 2223/426; G01N 21/95
USPC ......................................... 250/310, 306, 307
See application file for complete search history.

(56) References Cited

U.S. PATENT DOCUMENTS

| | | | | |
|---|---|---|---|---|
| 2010/0033560 A1* | 2/2010 | Kawasaki | ............ | G01N 23/203 |
| | | | | 348/79 |
| 2013/0316282 A1* | 11/2013 | Ishigami | .............. | G03G 9/1075 |
| | | | | 430/111.33 |

FOREIGN PATENT DOCUMENTS

| | | | |
|---|---|---|---|
| JP | 2001325911 A | 11/2001 |
| JP | 2002181725 A | 6/2002 |
| JP | 2002352764 A | 12/2002 |
| JP | 2004264039 A | 9/2004 |
| JP | 2009031214 A | 2/2009 |
| JP | 2011220723 A | 11/2011 |

\* cited by examiner

[FIG. 1]
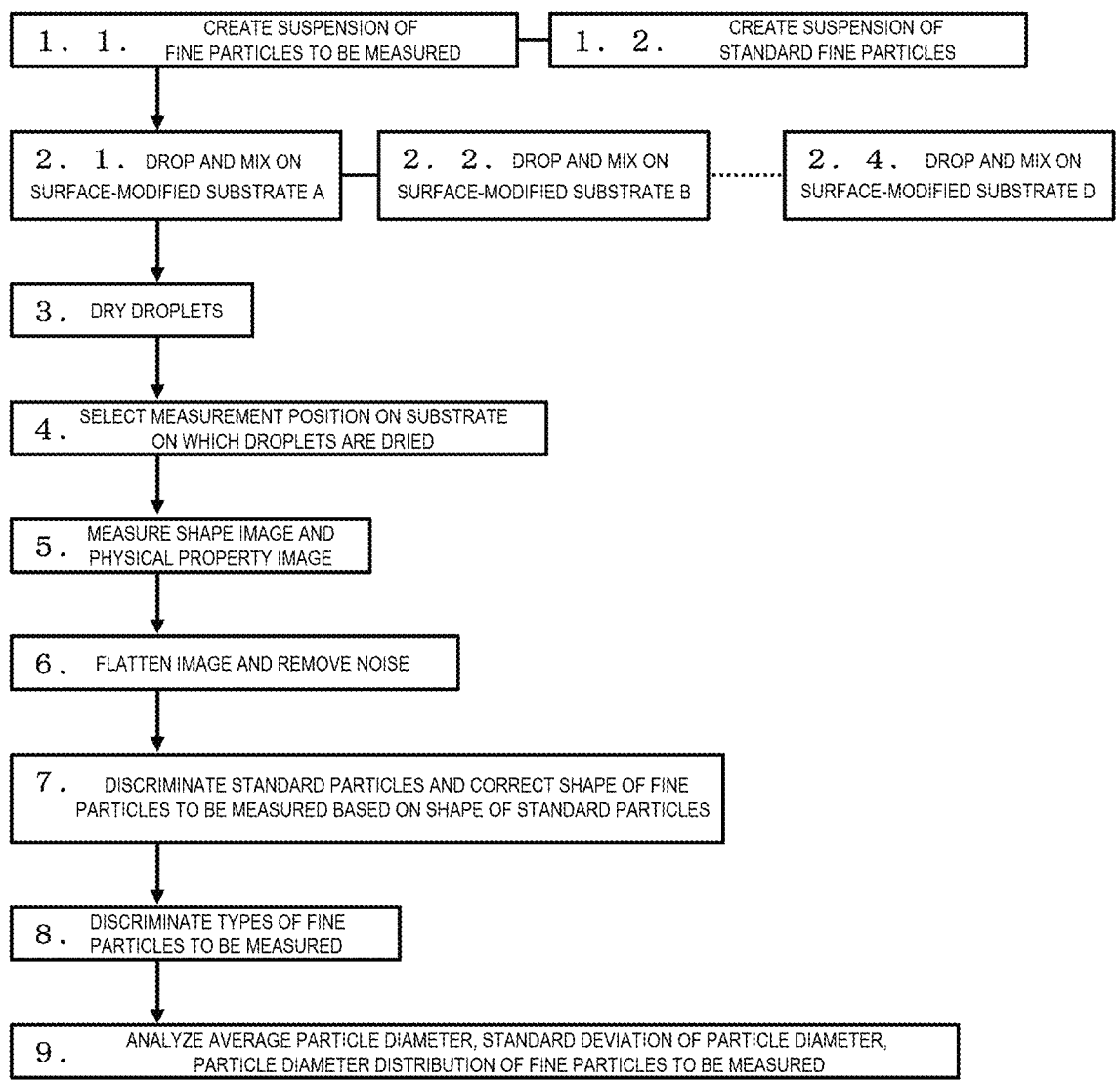

[FIG. 2A]
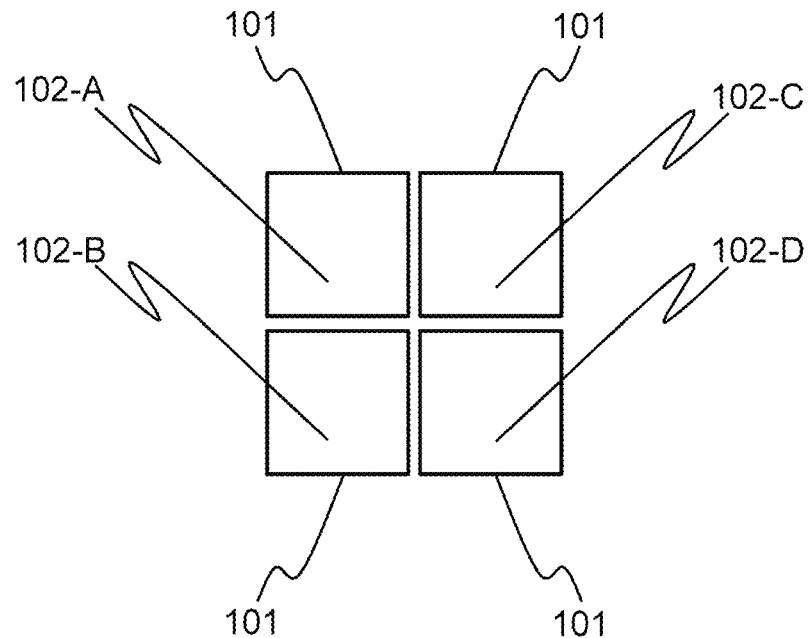
[FIG. 2B]
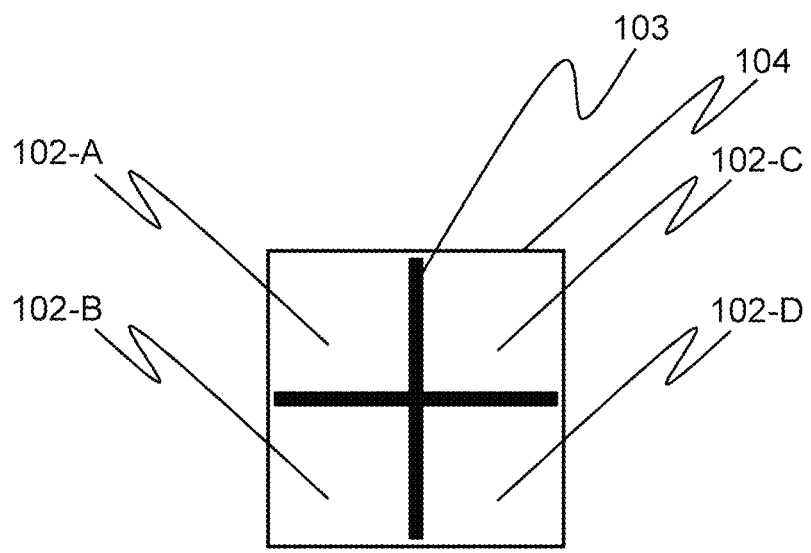

[FIG. 3A]
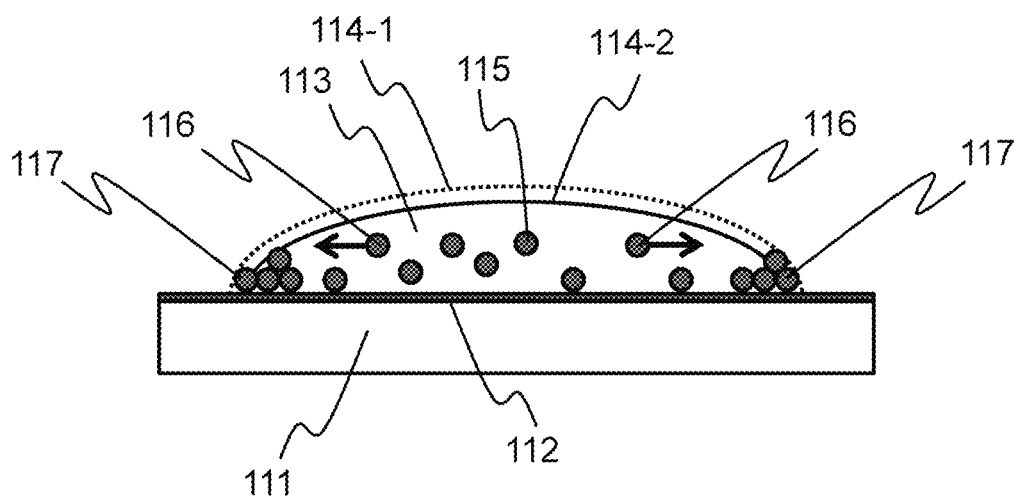
[FIG. 3B]
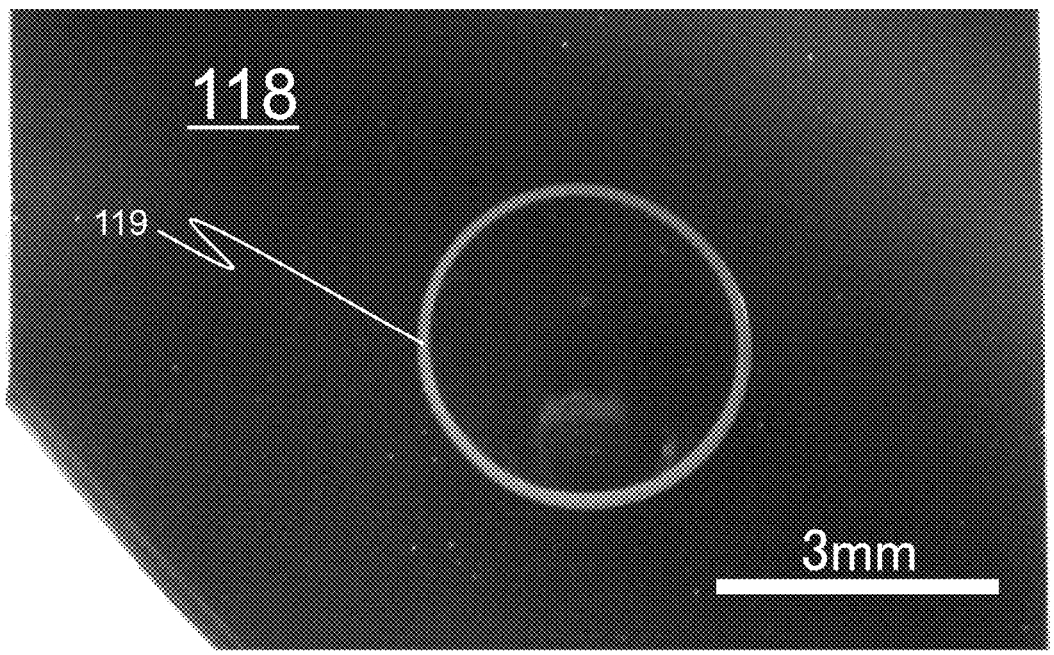

[FIG. 4A]
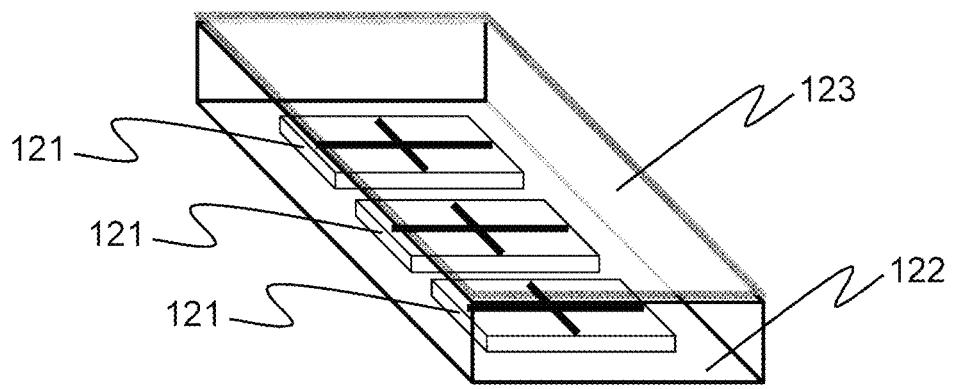
[FIG. 4B]
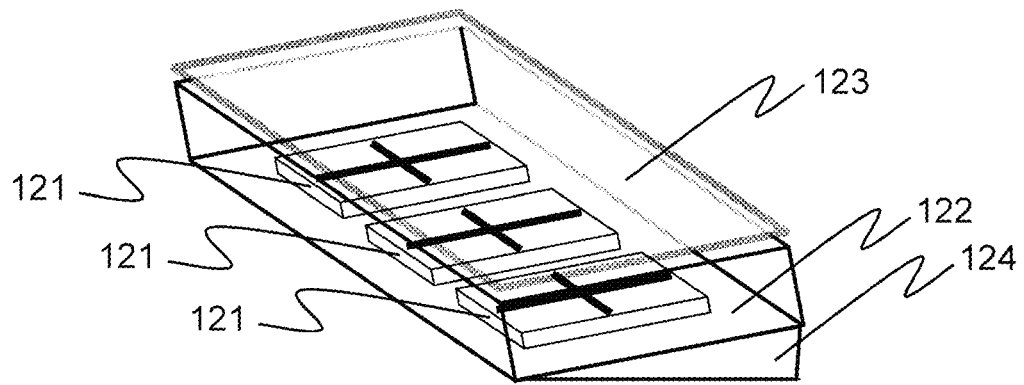
[FIG. 5A]
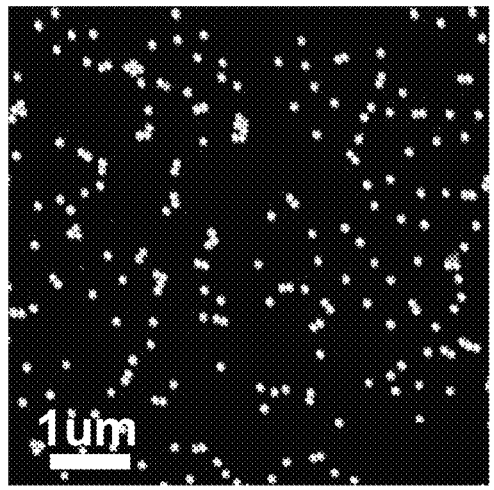

[FIG. 5B]
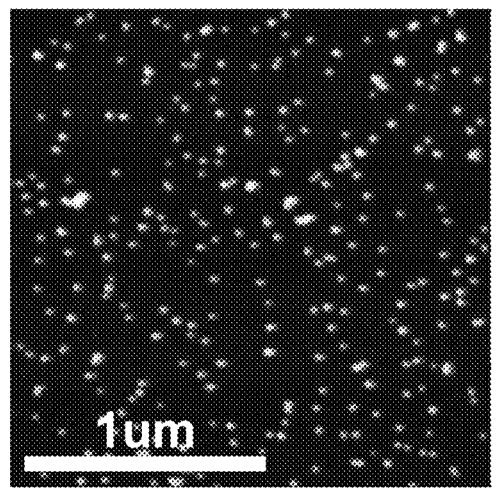
[FIG. 5C]
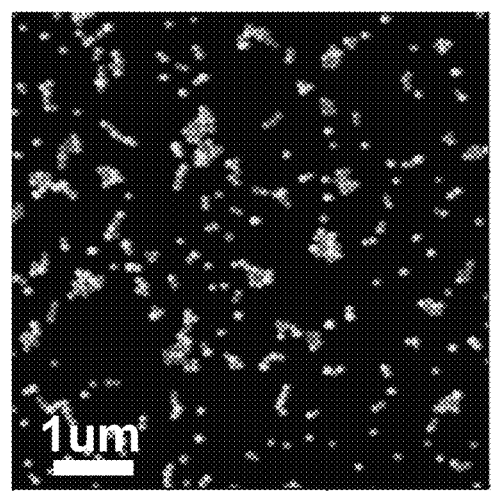

[FIG. 5D]
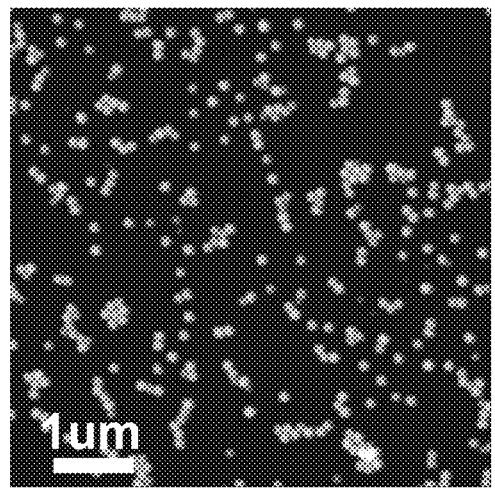
[FIG. 5E]
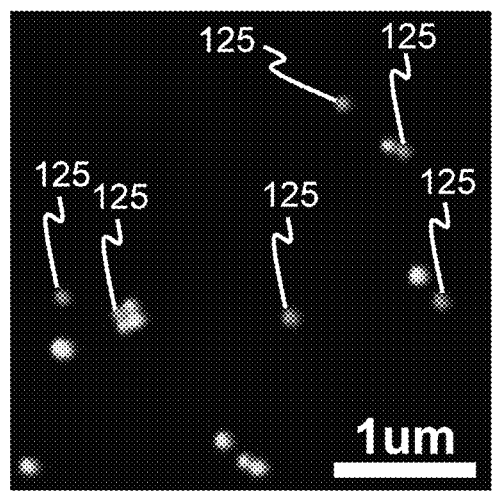

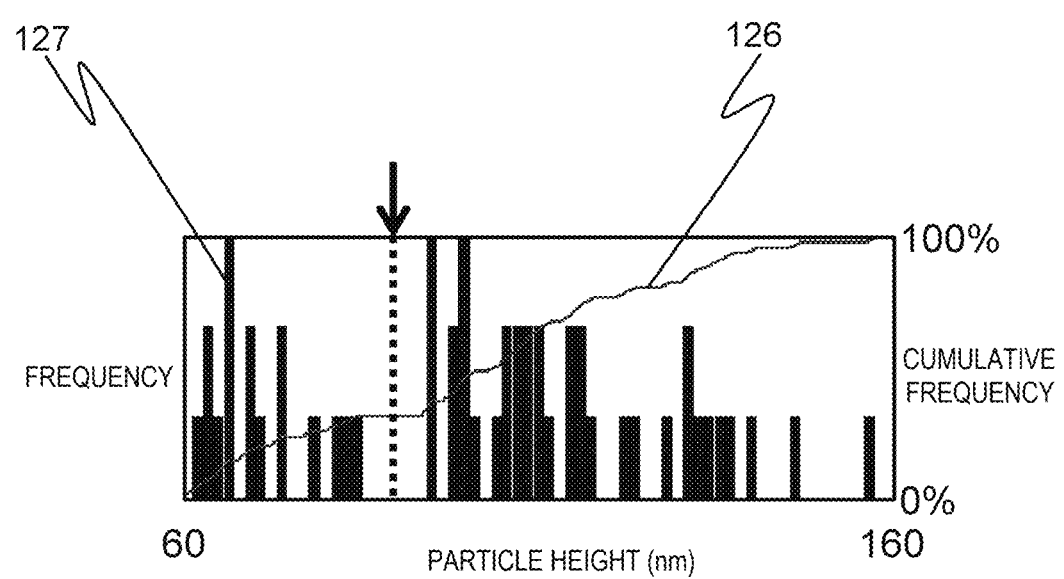

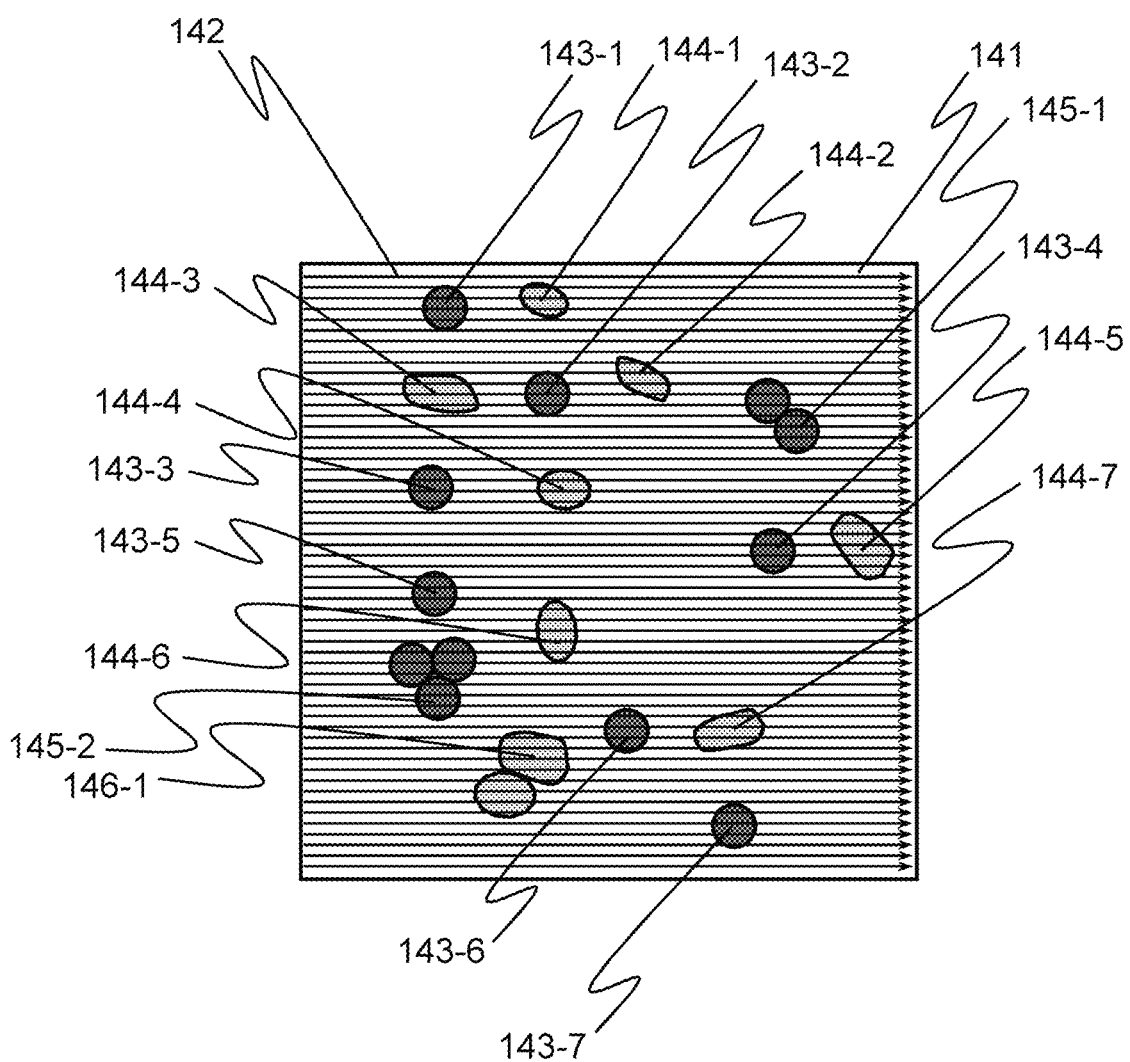
[FIG. 7]

[FIG. 9A]
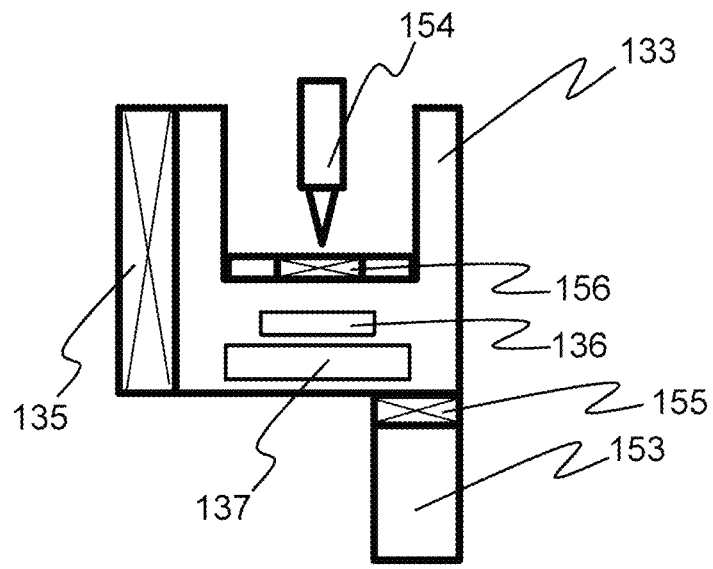
[FIG. 9B]
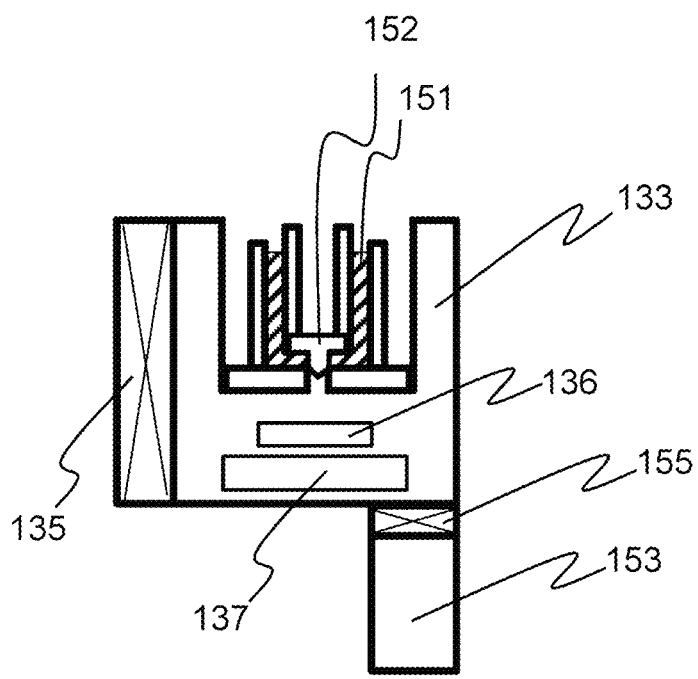

[FIG. 10]
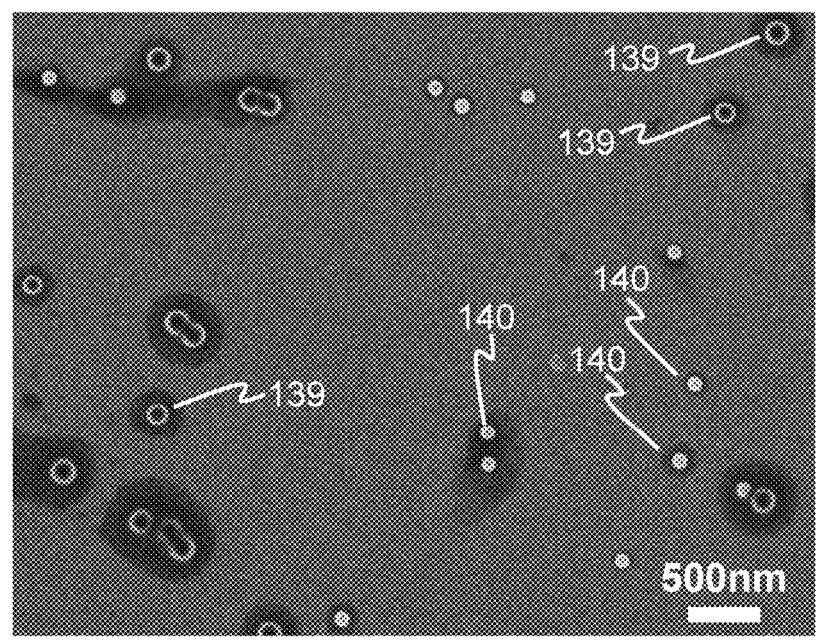

PARTICLE MEASURING DEVICE AND PARTICLE MEASURING METHOD

TECHNICAL FIELD

The present invention relates to a particle measuring device using a particle measurement sample in which standard fine particles and fine particles to be measured are spread, and a particle measuring method.

BACKGROUND ART

In recent years, fine particles (nanoparticles) with a particle diameter of 10 nm to several 100 nm, which are used in various industries such as cosmetics, are being regulated mainly in Europe and United States since it is concerned that they may be taken into the body or cells and cause health damage. In France and other countries, regulations are made depending on the particle diameter of the fine particles, and in the United States, regulations are made depending on the particle diameter and toxicity of the fine particles. Therefore, it is necessary to measure a shape of a particle and evaluate a particle type (particle material).

For measurement of the fine particles, shape measurement by a scanning probe microscope (SPM) and a microscope (hereinafter, a charged particle microscope) using a charged particle beam such as a scanning electron microscope (SEM) is about to be performed as standard. In a usual measurement of the fine particles, firstly, powder of the fine particles sampled from powder of a raw material is weighed and dispersed in a solution from which impurities are removed to create a suspension. At this time, types of particles contained in the fine particles, an average particle diameter of a particle of each type, standard deviation of the particle diameter, and particle diameter distribution are unknown, there are various particle shapes, and many particles have a shape other than a true sphere. As an example, a measurement procedure using an atomic force microscope (AFM), which is a type of the SPM, or a charged particle microscope is as follows.
(1) Create a suspension of fine particles to be measured
(2) Drop the suspension onto a flat substrate
(3) Dry droplets
(4) Evaluate with a probe and a charged particle beam profile by using a standard sample
(5) Select a location where fine particle density is optimum in the dried droplets by AFM or charged particle measurement
(6) Measure shape image with a sufficient number of fine particles for statistical processing
(7) Flatten the shape image and remove noise
(8) Particle analysis: calculate an average particle diameter of the fine particles to be measured, a particle diameter standard deviation, and particle diameter distribution In the SPM, a spatial resolution of about 1 nm can be expected in unevenness measurement (height measurement). However, in the shape measurement performed by the SPM, the particle diameter in a lateral direction (a direction parallel to a surface of the substrate on which the fine particles are fixed) is largely measured depending on a shape of a tip end of a probe, which is referred to as a probe shape effect. Therefore, it is necessary to correct measured shape information by some means. Further, in the charged particle microscope, a method of obtaining three-dimensional shape information of the fine particles is used by a measuring method such as inclining the substrate on which the fine particles are fixed with respect to an incident direction of charged particles. However, as same in the case of the SPM, the obtained image does not always accurately represent the shape of the sample due to intensity profile of the charged particle beam and a mechanism of secondary charged particle generation.

PTL 1 discloses a scanning probe microscope having a FEH in which a minute foreign matter such as adhered particles and standard particles in the vicinity of the minute foreign matter are disposed, or a scanning electron microscope (SEM), but it is not used for correcting the shape of the fine particles to be measured or physical property information.

PTL 2 discloses a measurement shape correction method that detects a state of a probe based on a measurement result of a standard sample whose shape is known, and corrects a measurement result of a sample surface based on the detected state of the probe. Further, by alternately measuring the standard sample and a sample to be measured, the probe shape effect is corrected and the sample shape information is obtained.

PTL 3 discloses a method of measuring surface roughness of nanoparticles in which a silica nanoparticle dispersion is dropped onto a mica substrate having an amino group on a surface thereof and is fixed by drying, a shape image of the silica nanoparticles is measured with an atomic force microscope (AFM), and an arithmetic mean roughness is calculated, so that a surface shape can be distinguished numerically.

CITATION LIST

Patent Literature

PTL 1: JP-A-2002-181725
PTL 2: JP-A-2004-264039
PTL 3: JP-A-2011-220723

SUMMARY OF INVENTION

Technical Problem

Inventors or the like use the method described in PTL 1 to correct the probe shape effect by alternately measuring the standard fine particles and the fine particles to be measured, which are disposed on different substrates, so as to obtain a three-dimensional shape of the sample. However, it has been found that reproducible data may not be obtained even when the measurement is performed by using the same sample.

Further, according to the method of fixing the silica nanoparticles (spread method) described in PTL 2, since the particles aggregate to forma two-dimensional island structure, the AFM image does not include information on sidewalls of individual nanoparticles, and the shape information cannot be obtained. Further, the sample shape information obtained by SPM measurement generally does not include information on the fine particle type (fine particle material).

An object of the invention is to provide a particle measuring device capable of evaluating the shape of a fine particle and a fine particle type, and a particle measuring method.

Solution to Problem

To achieve the above purpose, the invention provides a particle measuring device using a scanning electron microscope, the particle measuring device including: a scanning electron microscope body including a detector configured to detect secondary charged particles obtained by scanning a surface of a substrate on which an isolated fine particle to be measured and an isolated standard fine particle in the vicinity thereof are disposed with an electron beam probe; and a processing unit configured to process a detection signal of the detector and generate an image of the isolated fine particle to be measured and the isolated standard fine particle, in which the processing unit corrects a shape of the isolated fine particle to be measured by using a measurement result of the isolated standard fine particle disposed in the vicinity of the isolated fine particle to be measured.

Further, in order to achieve the above purpose, the invention provides a particle measuring method performed by a scanning electron microscope with a processing unit, the particle measuring method including: the processing unit processing a detection signal of detecting secondary charged particles obtained by scanning a surface of a substrate on which an isolated fine particle to be measured and an isolated standard fine particle in the vicinity thereof are disposed with an electron beam probe of the scanning electron microscope, and generating an image of the isolated fine particle to be measured and the isolated standard fine particle, and the processing unit correcting a shape of the isolated fine particle to be measured by using a measurement result of the isolated standard fine particle disposed in the vicinity of the isolated fine particle to be measured.

Advantageous Effect

According to the invention, a particle measuring device capable of evaluating the shape of a fine particle and a fine particle type, and a particle measuring method can be provided.

BRIEF DESCRIPTION OF DRAWINGS

FIG. 1 is a flow chart showing a measurement procedure of fine particles using a suspension containing fine particles to be measured and standard fine particles in a particle measuring method according to a first embodiment.

FIG. 2A is a schematic configuration plan view showing an example (a plurality of substrates) of a surface-modified substrate kit in a particle measurement sample according to the first embodiment.

FIG. 2B is a schematic configuration plan view showing another example (single substrate) of the surface-modified substrate kit in the particle measurement sample according to the first embodiment.

FIG. 3A is a schematic cross-sectional view for explaining a situation during drying droplets containing fine particles.

FIG. 3B is a diagram showing an example of an optical microscope photograph when a substrate is viewed from above after the droplets containing the fine particles are dried.

FIG. 4A is a bird's-eye view of a schematic configuration showing an example of a droplet drying kit used when the particle measurement sample according to the first embodiment is created.

FIG. 4B is a bird's-eye view of a schematic configuration showing another example (inclined drying mode) of the droplet drying kit used when the particle measurement sample according to the first embodiment is created.

FIG. 5A is a diagram showing an example of an AFM image in which fine particles are spread under a condition label a of Table 3 on a surface-modified substrate in the particle measurement sample according to the first embodiment.

FIG. 5B is a diagram showing an example of an AFM image in which fine particles are spread under a condition label b of Table 3 on the surface-modified substrate in the particle measurement sample according to the first embodiment.

FIG. 5C is a diagram showing an example of an AFM image in which fine particles are spread under a condition label c of Table 3 on the surface-modified substrate in the particle measurement sample according to the first embodiment.

FIG. 5D is a diagram showing an example of an AFM image in which fine particles are spread under a condition label d of Table 3 on the surface-modified substrate in the particle measurement sample according to the first embodiment.

FIG. 5E is a diagram showing an example of an AFM image in which fine particles are spread under a condition label e of Table 3 on the surface-modified substrate in the particle measurement sample according to the first embodiment.

FIG. 6 is a diagram showing a graph for explaining an example of fine particle discrimination based on fine particle shape information (distribution of fine particle heights) in the particle measurement sample according to the first embodiment.

FIG. 7 is a conceptual plan view for explaining shape measurement of non-spherical fine particles by AFM in the particle measuring method according to the first embodiment.

FIG. 9A is a conceptual diagram of a configuration of a fine particle spreading tank in the particle measuring device according to the second embodiment.

FIG. 9B is a conceptual diagram of another configuration of the fine particle spreading tank in the particle measuring device according to the second embodiment.

FIG. 10 is a diagram showing an SEM image obtained by observing standard fine particles and fine particles to be measured in a particle measurement sample according to a third embodiment.

DESCRIPTION OF EMBODIMENTS

Figure 8A:
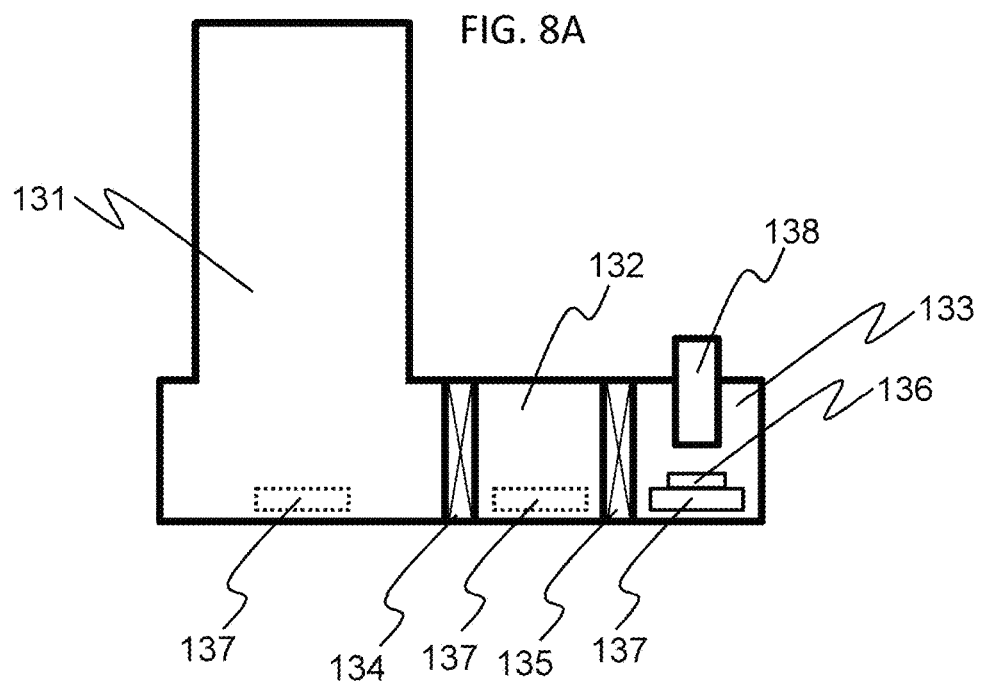
FIG. 8A is a conceptual diagram of a configuration example of a particle measuring device using an SEM according to a second embodiment.

Inventors or the like studied the reason why reproducible data cannot be obtained even when measurement is performed by using same fine particles to be measured and same standard fine particles. Depending on measurement conditions, a tip end of a probe for measurement may be worn during measurement due to interaction with the sample, and a shape of the tip end of the probe may change. Therefore, a further study is conducted on a method for minimizing influence of the wear of the probe, and it was found that the standard fine particles should be disposed in the vicinity of the fine particles to be measured. By measuring the standard fine particles in the vicinity of the fine particles to be measured and correcting the shape of the probe, the influence of the wear of the probe during the measurement can be minimized. Specifically, a sample is prepared such that the fine particles to be measured and the standard fine particles are present in one image (measurement screen, less than 50 μm, preferably several μm) on the same substrate, and shape information of the fine particles to be measured is obtained. As a result, the influence of the wear of the probe during the measurement is reduced, and good measurement results can be obtained. It should be noted that better results can be obtained by using the fine particles to be measured and the standard fine particles that are adjacent to each other.

The sample in which the standard fine particles are disposed in the vicinity of the fine particles to be measured is prepared as follows. That is, a suspension containing the fine particles to be measured and the standard fine particles is dropped onto a substrate modified with a functional group having a chemical or physical interaction, by drying droplets of the suspension, the fine particles to be measured and the standard fine particles coexist, and the fine particles are spread on the substrate with an arrangement of being separated in particle units (isolated particle spread). As a result, compared with a case where the suspension containing the fine particles to be measured and the standard fine particles is dropped onto an untreated substrate and dried, a sample suitable for the measurement can be created since there is less aggregation of the fine particles. Alternatively, a suspension containing the fine particles to be measured and a suspension containing the standard fine particles can be mixed on the substrate.

The sample with fine particles being spread is measured by a scanning probe microscope (SPM) or a microscope using a charged particle beam to obtain a length of the standard fine particles, and based on a result of the measurement, a shape of an SPM probe and a charged particle beam profile are corrected to obtain length information of the fine particles to be measured. As a result, influence of a change in the shape of the SPM probe and a change in the charged particle beam profile is reduced, and reproducible and accurate length information of the fine particles to be measured can be obtained. In addition, the fine particles to be measured and the standard fine particles coexist in one image (measurement screen), and accurate correction information can be obtained on a spot thereof, so that as compared with a measuring method in which the standard sample and the sample to be measured are alternately measured on different substrates and corrected, shape correction is reliably performed, and as a result, a measurement time can be shortened.

Further, it is possible to discriminate particle types depending on the shape of the particles and a physical property image measured at the same time, and to measure an average particle diameter and a standard deviation of particle diameters, and a particle diameter distribution for each particle type of the fine particles to be measured. In particle discrimination, information on an aspect ratio (long axis length/short axis length of a particle cross-sectional image) and composition of each particle can be used.

Hereinafter, embodiments of the invention will be described with reference to the drawings. Same reference numerals in the drawings indicate same constituent elements.

First Embodiment

The present embodiment is an embodiment of a particle measuring device and a method for measuring particles by a scanning probe microscope (SPM), and a measuring procedure thereof will be described below. It should be noted that measurement performed by a microscope using a charged particle beam can also be performed by the same procedure. FIG. 1 is a flow chart showing a measurement procedure of fine particles using a suspension containing fine particles to be measured and standard fine particles according to the present embodiment. The procedure for measuring the fine particles of present embodiment will be described with reference to FIG. 1. In the same figure, 1.1 to 9 are numbers of steps of the measurement procedure of fine particles.

[1. Create Suspension]

Similar to a usual measurement of fine particles, firstly, powder of fine particle sampled from powder of a raw material is weighed and dispersed in a solution from which impurities are removed to create a suspension. The solution used for creating the suspension is generally an aqueous solution. The solution includes a solvent (generally pure water) and a dispersant for suspending the fine particles, and as the dispersant, a surfactant, a buffering agent for adjusting acidic alkalinity of the solution, or the like is used. In the present embodiment, the suspension of the fine particles to be measured is created (Step 1.1), and a suspension of standard fine particles is created (Step 1.2).

In the present embodiment, the suspension of the fine particles to be measured and the suspension of the standard fine particles are created separately, but depending on a combination of the fine particles to be measured and the standard fine particles, powder of the fine particles to be measured and powder of the standard fine particles can be mixed at a stage of the powder of the fine particles, and dispersed in one liquid to create the suspension. When characteristics of a surface of the fine particles to be measured and the standard fine particles such as hydrophilicity, hydrophobicity, and organic affinity, and characteristics of the solution for the suspension such as acid, alkaline, and the dispersant are similar, it may be more appropriate to create a suspension containing both the fine particles to be measured and the standard fine particles.

The standard fine particles are true spherical fine particles whose shape can be approximated to a spherical shape, and fine particles having a small dispersion of the particle diameter are suitable. Further, in order to prevent a phenomenon in which fine particles overlap with each other and are hidden under microscopic observation, the particle diameter of the standard fine particles is optimally 0.7 to 1.3 times the particle diameter of the fine particles to be measured. However, this is not necessary under the condition that the fine particles can be spread on a substrate as isolated particles having an arrangement of being separated by the particle unit.

Table 1 is a table showing a surface state of nanoparticles, which are commercially available fine particles, in the suspension and typical dispersants. Nanoparticles with a particle diameter of 10 to 100 nm can be classified into polymer fine particles such as polystyrene latex (PSL), metal or alloy fine particles such as silver and gold, and inorganic fine particles (ceramic fine particles) including silica, alumina, calcium carbonate, hydroxyapatite $[Ca_5(OH)(PO_4)_3]_x$, and additionally, nitrides, carbides, carbon fine particles, diamond fine particles, and the like.

TABLE 1

| Nanoparticle | Surface state | Dispersant and the like |
|---|---|---|
| PSL (polystyrene latex) | Phenyl-based polymer —COOH group | Apart |
| Silver | Silver atom + Electric double layer | Stabilizing with weak acid |
| Gold | Gold atom + Electric double layer | Sodium citrate buffer |
| Silica | —Si-OH terminating group | Without dispersant |
| Alumina | —Al-OH terminating group | Without dispersant |
| Calcium carbonate | —C-OH terminating group | Surfactant |
| Hydroxyapatite $[Ca_5(OH)(PO_4)_3]_X$ | —Ca-OH terminating group —P-OH terminating group | Without dispersant |

The polymer fine particles generally show the organic affinity and are hydrophobic, but as in a case of PSL, some of them have a —COOH group chemically bonded to a surface to increase hydrophilicity. In the metal or alloy fine particles, an electric double layer is formed on a surface with a weak acid or weak alkaline solution to ensure stability in the solution. In the inorganic fine particles, there are cases where it is considered that oxygen on a surface of oxide fine particles is changed to —OH group and suspended in water without the dispersant, and where it has insufficient hydrophilicity as it is and is suspended in a solution by a dispersant such as the surfactant.

For the purpose of spreading the fine particles on the substrate as the isolated particles having the arrangement of being separated by the particle unit, it is desirable that a surface state of the standard fine particle in the suspension is similar to a surface state of the fine particle to be measured in the suspension. Therefore, if possible, it is desirable that the standard fine particles and the fine particles to be measured are of the same classification among the polymer fine particles, the metal or alloy fine particles, or the inorganic fine particles, but it is not always essential depending on a combination of the standard fine particles, the fine particles to be measured, and the substrate for spreading the fine particles.

PSL having a particle diameter of about 30 to 200 nm is suitable as the standard fine particle since a shape thereof is close to that of the true spherical particle and the dispersion of the particle diameter is small. Further, the silver having a particle diameter of about 30 to 80 nm, the gold having a particle diameter of about 15 to 100 nm, and the silica having a particle diameter of about 50 to 150 nm can also be used as the standard fine particles. For the silica fine particles, colloidal silica is suitable since it is easily dispersed in the aqueous solution.

[2. Drop and Mix on Surface-Modified Substrate]

The suspension of the fine particles to be measured and the suspension of the standard fine particles are spread on a substrate for spreading the fine particles whose surface is modified. Considering accuracy (measurement error) when measuring a height with the scanning probe microscope (SPM), a suitable area (8 to 20 mm square) of a silicon wafer for semiconductors, which is relatively easy to obtain, has little difference between wafers, and has excellent uniformity and flatness, is used as the substrate. At this time, it is desirable that the fine particles are spread on the substrate as the isolated particles with the arrangement of being separated by the particle unit.

For that purpose, a surface-modified substrate in which a surface of a silicon substrate is treated with a silane coupling agent to control an interaction with the fine particles is used. Table 2 is a table showing the silane coupling agents used for the surface-modified substrate, molecular structures and terminating groups of surface-modified groups, and expected interactions. The silicon substrate is usually covered with a native oxide film, is expected to have —Si—O—Si— and —Si—OH terminations, and is ideally hydrophilic, but in general, the silicon substrate exhibits water repellency due to adhesion of organic molecules. Therefore, the silicon substrate is firstly immersed in hydrochloric acid water ($HCl:H_2O_2:H_2O=3:1:1$) for 10 to 15 minutes to remove the impurities and perform the hydrophilic treatment. The pure and water-washed hydrophilic silicon substrate may be used as it is as a spread substrate (a substrate treatment in that case is referred to as Si—OH).

TABLE 2

| Silane coupling agent | Molecular structure | Terminating group | Expected interaction |
|---|---|---|---|
| HMDS hexamethyldisilazane | $(CH_3)_3Si-O-Si(CH_3)_3$ | Methyl group —$CH_3$ | Organic affinity |
| VTMS Vinyl trimethoxysilane | $CH_3O-Si(OCH_3)_2-CH=CH_2$ | vinyl group $CH=CH_2$ | Organic affinity |
| APTMS Aminopropyl trimethoxysilane | $H_2NCH_2CH_2CH_2-Si(OCH_3)_3$ | Amino group —$NH_2$ | Reaction with carboxylic acid, Hydrogen bond |

TABLE 2-continued

| Silane coupling agent | Molecular structure | Terminating group | Expected interaction |
|---|---|---|---|
| TMPT trimethoxysilylpropane thiol Another name MPTMS mercaptopropyltrimethoxysilane | 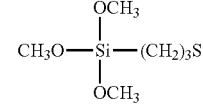 | Thiol group —SH | Metal such as gold, silver, and platinum bond with thiol |
| None (hydrophilic treatment) | — | Hydroxyl Group —OH | Hydrogen bond |

The silane coupling agents shown in Table 2 are used for a chemical treatment of a surface of the hydrophilized silicon substrate. The silicon wafer (8 to 20 mm square) is dropped with 10 to 20 μl of the silane coupling agent, spin-coated, and held at 90° C. for 10 minutes on a hot plate for heat drying treatment. VTMS (vinyl trimethoxysilane) is diluted to ⅕ with toluene to use. The silane coupling agent is silanolized by hydrolysis and partially condensed into an oligomer. After that, the agent is adsorbed by a hydrogen bond with a hydroxyl group on the surface of the silicon substrate, and the substrate is subjected to the heat drying treatment to induce a dehydration condensation reaction to form a strong chemical bond.

At this time, the surface of the substrate is chemically modified by the terminating group according to a type of the silane coupling agent. As a silane coupling material, HMDS (hexamethyldisilazane) (surface modification A), VTMS (vinyl trimethoxysilane) (surface modification B), APTMS (aminopropyl trimethoxysilane) (surface modification C), TMPT (trimethoxysilylpropane thiol (another name: MPTMS (mercaptopropyltrimethoxysilane)) (surface modification D), are used, and a methyl group, a vinyl group, an amino group, and a thiol group are respectively served as the terminating group. When not being treated with the silane coupling material, the hydroxyl group becomes the terminating group. The interactions with the fine particles expected by each terminating group are also summarized in Table 2 as the organic affinity, the hydrogen bond, and the like.

FIGS. 2A and 2B are diagrams showing schematic configurations of an example (a substrate) and another example (a plurality of substrates) of a surface-modified substrate kit of the present embodiment. The standard fine particles, the fine particles to be measured, and the combination of the surface-modified substrate are appropriately selected, such that the fine particles can be spread on the substrate as the isolated particles having the arrangement of being separated by the particle unit. Therefore, when the fine particles to be measured are the polymer fine particles, the metal or alloy fine particles, and the inorganic fine particles, a plurality of the surface modified substrates are combined and used as the surface modified substrate kit, so that sufficient interaction can be expected between the fine particles and the surface modified substrate. For example, the kit of the surface-modified substrate that is modified with the vinyl group (VTMS) expected to have the organic affinity, the thiol group (TMPT) expected to have metal-thiol bond, and the hydroxyl group (hydrophilic treatment) expected to have the hydrogen bond can be corresponded to various kinds of the fine particles to be measured.

FIG. 2A is a schematic configuration plan view of a surface-modified substrate kit in which a plurality of substrates are arranged, and as an example, in FIG. 2A, four surface-modified substrates are arranged. A substrate 101 is a silicon wafer having a size of 8 to 20 mm square, and substrate regions 102-A to 102-D are respectively modified by surface modifications A to D. The substrates 101 are respectively and individually surface-modified with the silane coupling agents shown in Table 2. FIG. 2B is a schematic configuration diagram of a surface-modified substrate kit using a single substrate, a substrate 104 is a silicon wafer having a size of 18 to 42 mm square, and after being subjected to hydrophilic treatment, substrate regions are divided by a surface-modified separation band 103 such as a vinyl tape having a height of about 0.5 mm. The substrate 104 is created by dropping the silane coupling agents of Table 2 corresponding to the surface modifications A to D on the respective substrate regions 102-A to 102-D, spin-coating them at once, and performing the heat drying treatment.

The suspension containing the fine particles to be measured and the suspension containing the standard fine particles are dropped and mixed into the surface-modified substrate kit (Steps 2.1 to 2.4 in FIG. 1). That is, firstly, 5 to 30 μl of the suspension of the fine particles to be measured is dropped onto the substrate regions 102-A to 102-D. Next, 5 to 30 μl of the suspension of the standard fine particles is dropped to suspension droplets of the fine particles to be measured. When the suspension containing both the fine particles to be measured and the standard fine particles is created, 10 to 60 μl of the suspension is dropped onto the substrate regions 102-A to 102-D. Further, depending on the combination of the fine particles to be measured, the standard fine particles, the suspension containing the fine particles to be measured and the suspension containing the standard fine particles, a plurality of substrates is not always necessary, and a single surface-modified substrate may be used.

Table 3 is a table showing a spread example of the fine particles on the surface-modified substrate. In Table 3, for each fine particle of the PSL, the gold, the silver and the silica, based on a specific gravity ρ of the fine particle material, a fine particle diameter d (nominal diameter of fine particle), a concentration c of the fine particles in the suspension, a drop volume v of the suspension, and a droplet diameter a (diameter of ring-shaped deposition of the fine particles after the droplets dried), a particle weight w, the number of particles n (number of fine particles contained in the droplet), a distance between particles L (distance between particles assuming that the particles are uniformly distributed within a circle of diameter a), and a relationship between the distance between particles L and the fine particle diameter d are calculated and shown. Further, Table 3 also shows a spread example in a case where the fine particles to be measured are silica and the standard fine particles are silver. At this time, it is advisable to change the concentration c of the fine particles in the suspension and the drop volume v of the suspension, so that a value obtained by distance between particles L/fine particle diameter d may be about 2 to 8.

TABLE 3

| Condition label | Type of fine particles | Specific Gravity ρ gw/cm³ | Fine particle diameter d nm | Concentration c mgw/ml | Drop volume v ml | Droplet diameter a mm | Particle weight w gw | Number of particle n | Distance between particles L nm | Number of particles in 1 μm | Substrate treatment | Drying condition | L/d |
|---|---|---|---|---|---|---|---|---|---|---|---|---|---|
| a | PSL | 1.05 | 100 | 0.01 | 0.01 | 3 | 5.5E−16 | 1.8E+08 | 212 | 25.7 | TMPT | Horizontally drying for 15 h | 2.12 |
| b | Gold | 19.30 | 30 | 0.01 | 0.01 | 4.5 | 2.7E−16 | 3.7E+08 | 224 | 23.0 | VTMS (1/5) | Horizontally drying for 15 h | 7.46 |
| c | Silver | 10.50 | 100 | 0.02 | 0.03 | 8 | 5.5E−15 | 1.1E+08 | 729 | 2.2 | Hydrophilic treatment | Horizontally drying for 15 h | 7.29 |
| d | Silica | 2.00 | 120 | 0.02 | 0.02 | 5 | 1.8E−15 | 2.2E+08 | 320 | 11.3 | VTMS (1/5) | Horizontally drying for 15 h | 2.67 |
| e | Silver | 10.50 | 75 | 0.02 | 0.01 | 5 | 2.3E−15 | 8.6E+07 | 513 | 4.4 | Hydrophilic treatment | Horizontally drying for 15 h | 6.84 |
|   | Silica | 2.00 | 100 | 0.02 | 0.01 | 5 | 1.0E−15 | 1.9E+08 | 345 | 9.7 |   |   | 3.45 |
| f | Gold | 19.30 | 90 | 0.01 | 0.04 | 5 | 7.4E−15 | 5.4E+07 | 646 | 2.8 | VTMS (1/5) | Horizontally drying for 15 h | 7.18 |
|   | PSL | 1.05 | 154 | 0.01 | 0.005 | 5 | 2.0E−15 | 2.5E+07 | 954 | 1.3 |   |   | 6.20 |

[3. Dry Droplets]

The suspension droplets are naturally dried to obtain a substrate having fine particles spread on the substrate (Step 3). FIG. 3A is a schematic cross-sectional view of droplets during drying. The droplets of the suspension formed on the substrate 111 modified with surface modification 112 gradually dry as time passes by, and a liquid surface 114-1 of the liquid droplet gets smaller gradually and becomes a liquid surface 114-2. The droplet is made of a solution 113 and fine particles 115, and since the solvent evaporates faster at an outer side of the droplet (in FIG. 3A, a right side and a left side) than at an inner side of the droplet, movement of the solution from the inner side towards the outer side occurs. Therefore, among the fine particles 115, fine particles 116 that move toward the outer side of the droplet are generated. The particles 115 are deposited on the substrate depending on conditions such as interaction between the surface modification 112 and the particles 115, a concentration of the fine particles 115 in the suspension, and ease with which the particles 115 are suspended in the solution 113. Due to the fine particles 116 moving toward the outer side of the droplet, the concentration of the fine particles is high on the outer side of the droplet, the fine particles are likely to be deposited, and a ring-shaped deposition 117 of the fine particles is formed on the outer side of the droplet. This phenomenon is commonly known as a coffee ring effect (coffee stains).

FIG. 3B is a diagram showing an example of an optical microscope photograph of a substrate after the droplets are dried. A ring-shaped deposition 119 of the fine particles is observed on a surface-modified substrate after the droplets are dried 118. In the ring-shaped deposition 119 of the fine particles, fine particles are often deposited in a multi-layered manner, and are often not suitable for measuring heights and shapes of the fine particles. When the concentration of the dispersant contained in the solution of the suspension is not low, most of the dispersant remain in the solution until a final stage of droplet drying, and crystallize at an inner side of the ring-shaped deposition of the fine particles (mostly near the center) (not seen in FIG. 3B).

When the suspension droplets are air dried in an open system, a droplet of 10 μl is dried in about 1 to 2 hours. In FIG. 3A, if the interaction between the surface modification 112 and the fine particles 115 is appropriate, clustering of the fine particles can be prevented by increasing a drying time and slowly evaporating the solvent.

FIG. 4A is a bird's-eye view of a schematic configuration showing a droplet drying kit. For the surface-modified substrate kit 121 shown in FIGS. 2A and 2B, the drying time can be extended by covering the kit with a sample container 122, and a gap between the sample container 122 and a lid 123 can be controlled to increase or decrease the drying time. By setting the gap between the sample container 122 and the lid 123 to be about 0.1 mm, a droplet of 20 μl is dried in about 15 hours. In Table 3, as a typical example of long-time drying, a drying condition is expressed as drying for 15 h.

Normally, the surface-modified substrate kit 121 is substantially horizontally held in the sample container 122 on a table. When the concentration of the dispersant contained in the solution is high, the dispersant may be deposited and crystallized around the fine particles, with the fine particles deposited on the substrate as the nuclei during the long-time drying. In that case, it is advisable to incline the surface-modified substrate kit 121 by about 5 to 10 degrees and dry it in a relatively short time. FIG. 4B is a bird's-eye view of a schematic configuration showing the droplet drying kit in an inclined drying mode. The sample container 122 is inclined by an inclining table 124, and the gap between the sample container 122 and the lid 123 is maintained at about 2 mm. At this time, a droplet of 20 μl is dried in about 2 to 3 hours.

[4. Select Measurement Position on Substrate on Which Droplets are Dried]

On the substrate after the droplets are dried, the ring-shaped deposition 119 of the fine particles is observed as in the example of the optical microscope photograph of FIG. 3B. In many cases, the fine particles are dispersed and deposited on a slightly inner side of the ring-shaped deposition 119 of the fine particles. However, the fine particles may also be deposited on a slightly outer side of the ring-shaped deposition 119 of the fine particles. While observing with an optical microscope, a place having an appropriate particle density of dried droplets is selected, and an image is acquired with an atomic force microscope (AFM) to select a measurement position (Step 4). On a particle measurement screen, it is preferable that 300 or more of each of the fine particles to be measured and the standard fine particles are dispersed in an AFM image, but fine particle shape information can also be integrated by a plurality of AFM images.

FIGS. 5A to 5E are examples of the AFM images of the fine particles spread on the surface-modified substrate. FIGS. 5A to 5E are respectively based on spread examples under condition labels a, b, c, d, and e in Table 3. Drying conditions of the droplets are horizontally holding the surface-modified substrate kit and drying for along time. FIG. 5A is a spread example of PSL fine particles on a TMPT surface-treated substrate, in which the fine particles are spread on the substrate with the arrangement of being separated by the particle unit, and good isolated particle spread is implemented. This is probably because the —COOH group on a PSL surface is chemically bonded to the —SH group on the surface-modified substrate by a thioester bond.

FIG. 5B is a spread example of the fine particles of the gold on a VTMS (diluted to 1/5 with toluene) surface-treated substrate, in which the good isolated particle spread is implemented. FIG. 5C is a spread example of the fine particles of the silver on the surface-treated substrate subjected to the hydrophilic treatment, and FIG. 5D is a spread example of the fine particles of the silica on the VTMS (diluted to 1/5 with toluene) surface-treated substrate, and a relatively good isolated particle spread is implemented in both examples.

Table 4 is a table showing ease with which the fine particles are spread on the substrate (isolated particle spread) with the arrangement of being separated by the particle unit depending on the combination of the surface modification treatment, the surface modifying group, and the fine particles. In Table 4, ⊚ indicates a case where the good isolated particle spread is implemented, ○ indicates a case where a relatively good isolated particle spread is implemented, indicates a case where a partial isolated particle spread is implemented, and x indicates a case where the isolated particle spread is not implemented and fine particles having an aggregated arrangement (fine particle clusters) are generated.

TABLE 4

| Type of fine particle | HMDS —CH$_3$ | VTMS (1/5) —CH═CH$_2$ | TMPT —SH | Hydrophilic Treatment—OH |
|---|---|---|---|---|
| PSL | O | | ⊚ | |
| Gold | | ⊚ | | O |
| Silver | | ⊚ | X | O |
| Silica | X | O | X | ⊚ |

FIG. 5E is a spread example in which the fine particles to be measured are the silica and the standard fine particles are the silver in the surface-treated substrate subjected to the hydrophilic treatment. After 10 μL of a suspension of the fine particles of the silica is dropped, 10 μL of a suspension of the fine particles of the silver is dropped and mixed into the droplet and dried for a long time. The relatively good isolated particle spread is implemented for both fine particles.

[5. Measure Shape Image and Physical Property Image]

At the measurement position selected by the AFM image, a shape image (AFM image) and, if necessary, a physical property image (viscoelasticity image, friction force image, current image, magnetic force image) obtained by SPM measurement are measured (Step 5). The AFM image is a one-screen image (shape image) or a two-screen simultaneous measurement image (shape image+phase image), and the SPM image is a two-screen simultaneous measurement image (shape image+physical property image).

[6. Flatten Image and Remove Noise]

In the obtained AFM image, the height of the substrate is not always constant (horizontal), and since there is a thermal drift or a vertical drift due to the device, data treatment for flattening the substrate is performed (Step 6). Further, the AFM image and the SPM image are subjected to noise removal such as smoothing and frequency selective filtering, so that the subsequent data processing can be performed accurately (Step 6).

[7. Discriminate Standard Fine Particles and Correct Shape of Fine Particles to be Measured Based on Shape of Standard Fine Particles]

The obtained AFM image and the SPM image are used to discriminate the fine particles to be measured and the standard fine particles (Step 7). Discrimination of the fine particle is that the fine particles to be measured and the standard fine particle are discriminated based on fine particle shape information (height, aspect ratio, roundness, unevenness roughness, phase roughness) and physical property information (viscoelasticity, surface friction, conductivity, magnetic properties). Here, an example is shown in which the fine particles to be measured are the silica with an average fine particle diameter of 100 nm, and the standard fine particles are the silver with an average fine particle diameter of 75 nm, and the fine particles to be measured are discriminated from the standard fine particles according to the height of the fine particles. Details of a method for discriminating the fine particles will be described below.

FIG. 5E is an example of an AFM image of the fine particles of the silica and the fine particles of the silver spread on a hydrophilic-treated substrate under the spread condition of the condition label e in Table 3. FIG. 6 is a diagram showing an example of discrimination based on the fine particle shape information (distribution of fine particle heights). FIG. 6 is a result of analyzing an AFM image of another field of view on the same spread substrate as in FIG. 5E, in which a bar graph 127 shows a distribution of heights of the fine particles, and a polygonal line 126 shows a cumulative frequency of the heights of the fine particles.

An arrow and a broken line in FIG. 6 indicate a position where a height of a fine particle is 90 nm. The height distribution of the fine particles is divided into two parts on a left side and a right side of the broken line, and in this case, it is understood that the fine particles can be discriminated by the height distribution of the fine particles. The left side of the broken line is the fine particles of the silver as the standard fine particles, and the right side is the fine particles of the silica as the fine particles to be measured. At this time, the average and standard deviation of the heights of the respective fine particles are 75.3 nm and 7.2 nm for the fine particles of the silver, and are 102.2 nm and 10.4 nm for the fine particles of the silica. When the fine particles in FIG. 5E are discriminated, those having a height of 90 nm or less are discriminated as the fine particles of the silver, those having a height of 90 nm or more are discriminated as the fine particles of the silica, and six fine particles 125 are discriminated as the fine particles of the silver while other fine particles are the fine particles of the silica.

FIG. 7 is a conceptual plan view for explaining shape measurement performed by AFM and a shape correction procedure. In the shape measurement performed by the AFM, a probe scans along a measurement scanning line 142 and height information of the probe is recorded. A large number of the measurement scanning lines 142 exist on a measurement screen 141 at equal intervals in an orthogonal direction of scanning. In FIG. 7, it is assumed that the measurement scanning lines 142 are sequentially scanned from top to bottom (raster scanning method).

In FIG. 7, it is considered that on the measurement screen 141, there are standard fine particles (isolated standard fine particles) 143-1 to 143-7 having the arrangement of being separated by the particle unit, and fine particles to be measured (isolated fine particles to be measured) 144-1 to 144-7 having the arrangement of being separated by the particle unit. In the substrate on which the fine particles are spread, not all the fine particles are necessarily isolated, and there are also standard fine particles (standard fine particle clusters) 145-1 to 145-2 having an aggregated arrangement, and fine particles to be measured (clusters of the fine particle to be measured) 146-1 having the aggregated arrangement, but here, these are not used for shape measurement. However, these particles can be used for height measurement. Further, by expanding a shape correction method, the fine particle clusters can be used for the shape measurement. As a method of dividing measurement information of the fine particles into fine particles, including a case where the fine particles form the clusters, by using the shape information, it is possible to use a method of separating the fine particles into individual fine particles by using, for example, a watershed method or the like.

In FIG. 7, the shape information of the fine particles is measured in the order from the top to the bottom of the measurement scanning lines 142, but for shape correction, the shape information of the isolated standard fine particles in the vicinity of the isolated fine particles to be measured is used. That is, firstly, a shape of the isolated fine particle to be measured 144-1 is corrected based on shape information of the isolated standard fine particle 143-1. Next, shape correction of the isolated fine particle to be measured 144-2 and the isolated fine particle to be measured 144-3 is performed based on shape information of the isolated standard fine particle 143-2. Similarly, shape correction of the isolated fine particle to be measured 144-4 is corrected by the isolated standard fine particle 143-3, shape correction of the isolated fine particle to be measured 144-5 is corrected by the isolated standard fine particle 143-4, shape correction of the isolated fine particle to be measured 144-6 is corrected by the isolated standard fine particle 143-5, and shape correction of the isolated fine particle to be measured 144-7 is corrected by the isolated standard fine particle 143-6 (Step 7).

[8. Discriminate Types of Fine Particles to be Measured]

When there is a plurality of fine particles to be measured, types of the fine particles to be measured are discriminated based on the fine particle shape information (height, aspect ratio, roundness, unevenness roughness, phase roughness) and the physical property information (composition) (Step 8).

[9. Analyze Average Particle Diameter, Standard Deviation of Particle Diameter, and Particle Diameter Distribution of Fine Particles to be Measured]

The average particle diameter, the standard deviation of the particle diameter, and the particle diameter distribution of each type of fine particles to be measured are obtained (Step 9).

As described above, according to the present embodiment, it is possible to provide a particle measuring method and a particle measuring device capable of evaluating the shape of a fine particle and a fine particle type.

Second Embodiment

The second embodiment is an embodiment of a particle measuring device that enables automatic measurement including dropping of a suspension of the fine particles onto a surface of a surface-modified substrate. The matters described in the first embodiment and not described in the present embodiment can also be applied to the present embodiment unless otherwise specified. The present embodiment is an embodiment of automatic measurement performed by an SEM, further including a fine particle spreading tank provided in a sample introduction port of the scanning electron microscope, and in the fine particle spreading tank, a substrate on which the isolated fine particles to be measured and the isolated standard fine particles in the vicinity thereof are disposed is prepared, and the prepared substrate is introduced from the sample introduction port into a scanning electron microscope body for measurement.

FIG. 8A is a conceptual diagram of a configuration of the particle measuring device according to the second embodiment. As shown in FIG. 8A, a scanning electron microscope body 131 of the SEM includes a sample stage and a sample transport mechanism 137, and a substrate 136 can be introduced from a sample introduction tank 132 into the scanning electron microscope body 131 through a vacuum valve 134 for measurement. Further, in the configuration of the present embodiment, a fine particle spreading tank 133 is provided at a sample introducing port of the sample introducing tank 132. A fine particle suspension dropping device 138 is provided in the fine particle spreading tank 133 to drop the fine particle suspension on the surface of the substrate 136. Then, the substrate 136 prepared in the fine particle spreading tank 133 is introduced into the scanning electron microscope body 131 through a vacuum valve 135, the sample introducing tank 132, and the vacuum valve 134 by using the sample stage and the sample transport mechanism 137.

Figure 8B:
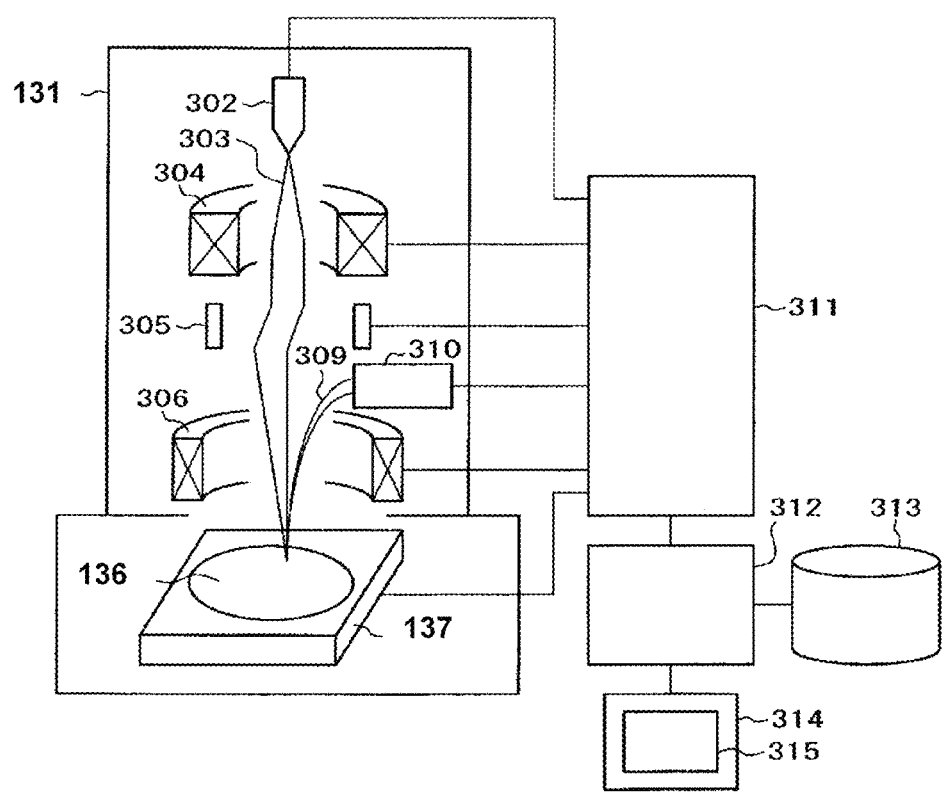
FIG. 8B is a schematic diagram of the configuration example of the particle measuring device using an SEM according to the second embodiment.

(FIG. 8B is a schematic diagram showing an example of an overall schematic configuration of the SEM, and the sample introduction tank 132 and the fine particle spreading tank 133 are not shown. As shown in the same figure, a lens barrel 131 of the SEM includes: an electron source 302; a focusing lens 304 that focuses an electron beam 303 emitted from the electron source 302; a deflection electrode 305 that deflects the focused electron beam, that is, an electron beam probe; an objective lens 306 that converges the deflected electron beam probe with which the surface of the substrate 136, which is a sample, is irradiated; a detector 310 configured to detect secondary electrons (also including reflected electrons) generated from a substrate 307 irradiated with the electron beam probe; a control system 311 that processes a signal output from the detector 310 and meanwhile controls the electron source 302, the focusing lens 304, the deflection electrode 305, the objective lens 306, the sample stage, and the sample transport mechanism 137; a computer 312 which is a processing unit that is connected to the control system 311, processes a detection signal, and outputs an image signal; a data storage device 313 connected to the computer 312; and a monitor 314 including a screen 315.

In this configuration, the computer 312 sends a command to the control system 311, such that the substrate 136 is moved into the device by using the sample stage and the sample transport mechanism 137 and a position thereof is adjusted, the focusing lens 304, the objective lens 306, and the deflection electrode 305 are electrically adjusted to obtain a top view image of the substrate 136 by the image signal from the computer 312, and after being recorded in a storage area in the computer 312, the top view image is stored in the data storage device 313 together with data of imaging conditions. After that, the image is designated by the command from the computer 312, and a file of an image and an imaging condition thereof is called from the data storage device 313, such that SEM images of the fine particles to be measured and the standard fine particles can be displayed on the screen 315 of the monitor 314 for example, as shown in FIG. 10.

In the configuration of the present embodiment, in [2. Drop and Mix on Surface-modified Substrate], when the suspension of the fine particles to be measured and the suspension of the standard fine particles are spread on the substrate for spreading the fine particles whose surface is modified, the fine particle suspension dropping device 138 is used. By using the surface-modified substrate kit of FIG. 2A as a sample substrate, it is possible to spread the fine particles on the substrate 101 as the isolated particles with the arrangement of being separated by the particle unit. The suspension containing the fine particles to be measured and the suspension containing the standard fine particles are dropped and mixed onto the surface of the substrate of the surface-modified substrate kit (Steps 2.1 to 2.4). After that, the substrate prepared by spreading the fine particles is introduced into the scanning electron microscope body from the sample introduction port, and predetermined automatic measurement is performed.

FIG. 9A is a conceptual diagram of a configuration of a fine particle spreading tank using an electric micropipette as the fine particle suspension dropping device of the particle measuring device of the present embodiment shown in FIG. 8A. In the particle spreading tank 133, a vacuum valve 156 provided above the substrate 136 moved by the sample stage and the sample transport mechanism 137 is opened, such that the fine particle suspension is dropped onto the substrate 136 from an electric micropipette 154. At this time, the electric micropipette 154 can be moved so as to approach the substrate 136. At this time, the fine particle spreading tank 133 is filled with dry air at atmospheric pressure or close to atmospheric pressure, dry nitrogen, rare gases such as helium, and the like, and dropping is performed. After the dropping of the fine particle suspension, droplets can be dried under an atmospheric pressure condition as it is, but the vacuum valve 155 can also be opened and dried under reduced pressure by a vacuum pump 153. As the vacuum pump 153, a scroll pump having a low oil vapor pressure or a turbo molecular pump is suitable.

FIG. 9B is a conceptual diagram of a configuration of a fine particle spreading tank using a pulse valve as the fine particle suspension dropping device of the particle measuring device of the present embodiment. The pulse valve is a valve that can instantaneously open a poppet 152, which is a valve closed by a spring, with a solenoid, and open the valve only for a few seconds to a few tens of seconds to allow a liquid of about 1 to 10 μl to pass through; and is a valve that can introduce a suspension 151, which is the liquid, into a decompression container from the atmospheric pressure. In this case, the suspension 151 is generally sprayed in a state where the vacuum valve 155 is opened, and the fine particle spreading tank 133 is depressurized by the vacuum pump 153, which means that the suspension is dried under the reduced pressure, but the tank can be filled with the dry air at atmospheric pressure or close to atmospheric pressure, the dry nitrogen, the rare gases such as helium, and the like, and the dropping can be performed.

According to the particle measuring device using the SEM provided with the fine particle spreading tank of the present embodiment, it is possible to perform the automatic measurement of particles using the SEM, including the dropping of the suspension of the fine particles onto the surface of the surface-modified substrate. It should be noted that measurement performed by another charged particle beam microscope such as a scanning probe microscope can also be performed by the same procedure.

Third Embodiment

The third embodiment is an embodiment of the particle measuring device and a particle measuring method in which a SEM is used to implement a method of correcting a fine particle diameter using the standard fine particles and the fine particles to be measured. The matters described in the first embodiment and the second embodiment and not described in the present embodiment can also be applied to the present embodiment unless otherwise specified.

In the present embodiment, the method of correcting a fine particle diameter by using the standard fine particles and the fine particles to be measured performed by a computer, which is the processing unit, will be described by taking an example of particle measurement performed by the SEM shown in FIG. 8A. FIG. 10 is a diagram showing an SEM image obtained by observing PSL fine particle examples 139, which are standard fine particles with an average fine particle diameter of 154 nm, and gold fine particle examples 140, which are fine particles to be measured with an average fine particle diameter of 90 nm in a particle measurement sample according to the third embodiment. A sample in FIG. 10 is spread on the VTMS (diluted to ⅕ with toluene) surface-treated substrate under the spread conditions indicated by the condition label f in Table 3. As described above, in the SEM image, it is not always general that a center of the spherical fine particle is observed brightly, and in the example of FIG. 10, the spherical fine particles are observed in a donut shape. In the case of this SEM image, since the PSL fine particle example 139 which are standard fine particles and the gold fine particle example 140 which are the fine particles to be measured have different average fine particle diameters as described above, they can be easily separated by using the fine particle diameter.

Figure 11A:
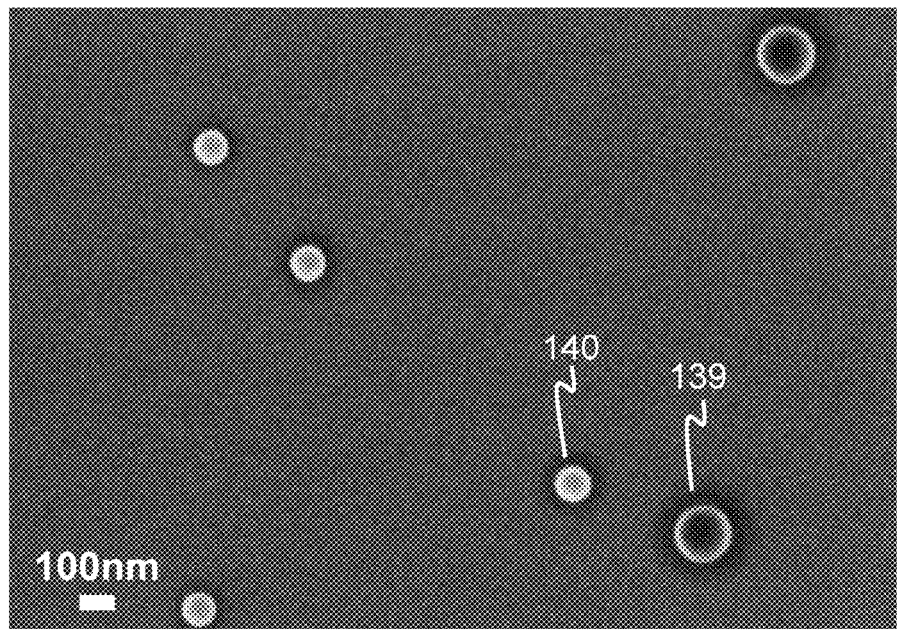
FIGS. 11A and 11B are diagrams showing SEM images obtained by observing the standard fine particles and the fine particles to be measured in different conditions in the particle measurement sample according to the third embodiment.
Figure 11B:
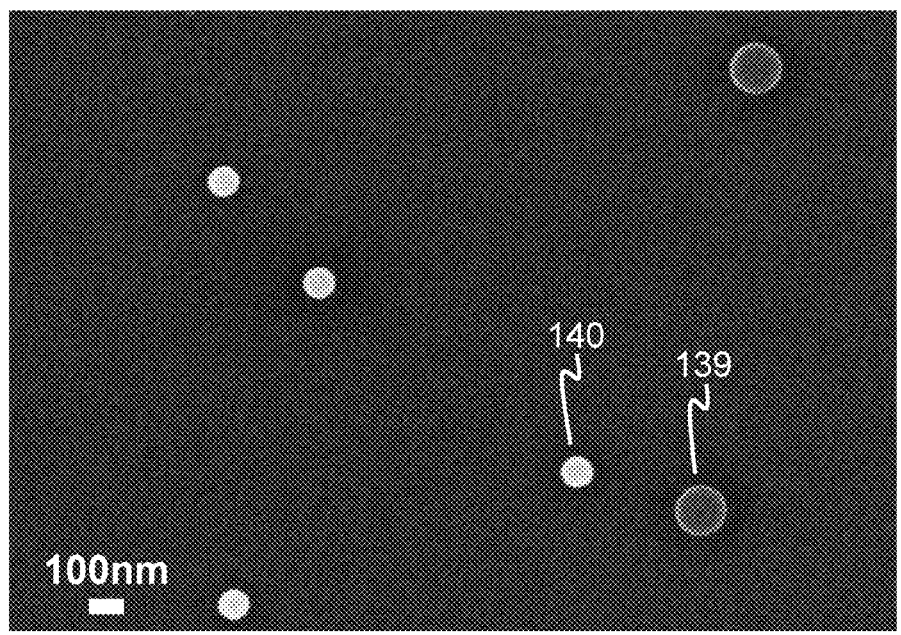

FIGS. 11A and 11B show two SEM images obtained by observing substantially the same place under different conditions in the particle measurement sample according to the third embodiment. It can be seen that in FIGS. 11A and 11B under different observation conditions, corresponding fine particle diameters are observed with different sizes and different brightness profiles. In the particle measuring device of the present embodiment, image processing is performed by executing a program of the computer 312, so that a difference in fine particle diameter when observing under such different conditions can be corrected by the following correction method using measurement results of the standard fine particles.

Figure 12A:
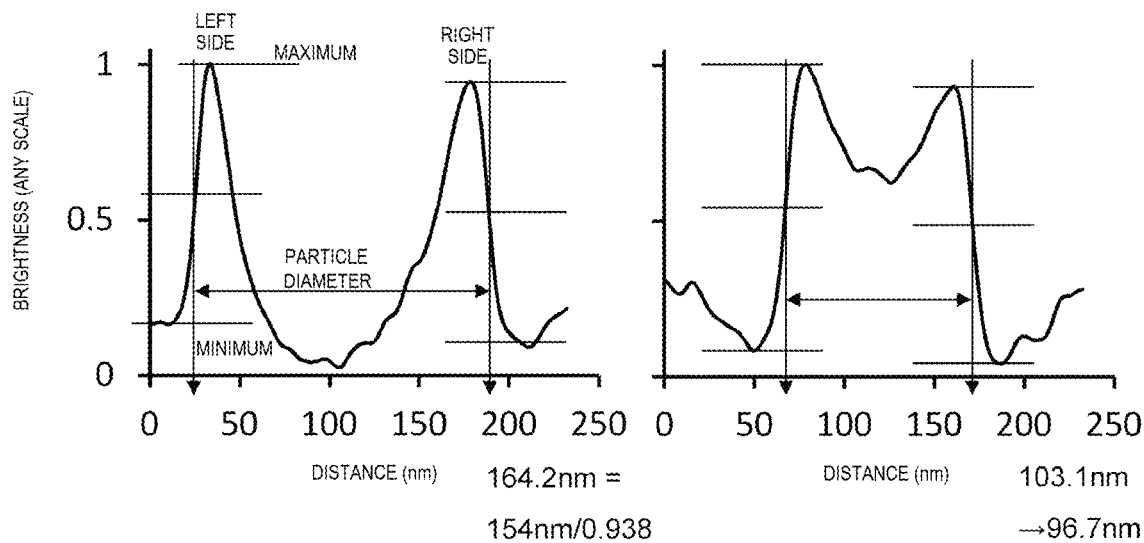
FIGS. 12A and 12B are explanatory diagrams of a cross-sectional profile of the observed standard fine particles (left) and fine particles to be measured (right), and a fine particle diameter correction method according to the third embodiment.
Figure 12B:
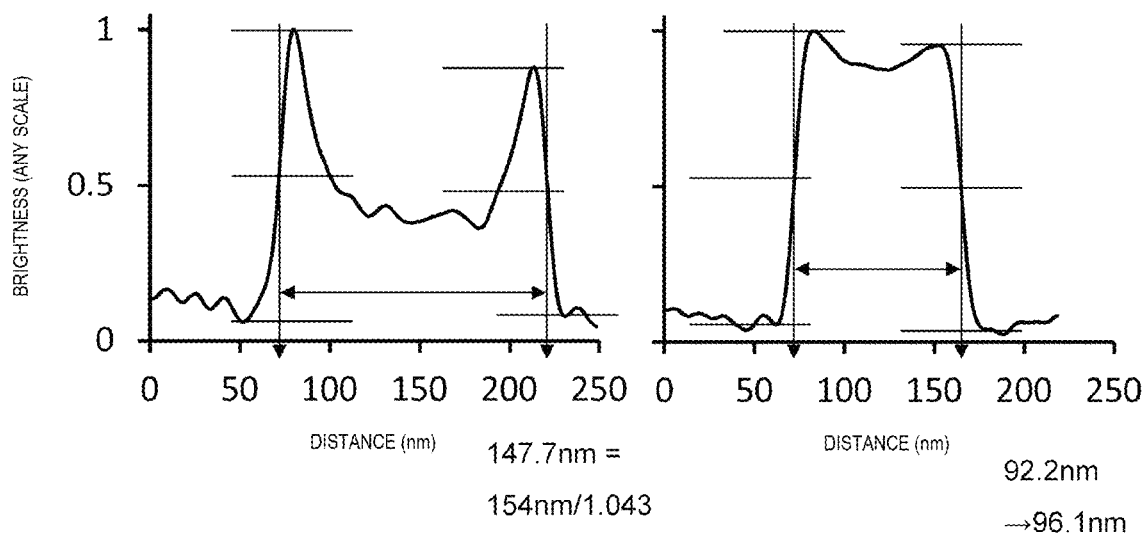

FIGS. 12A and 12B are explanatory diagrams of a cross-sectional profile of brightness of the standard fine particles and the fine particles to be measured obtained as shown in FIGS. 11A and 11B and measured by the SEM, and the fine particle diameter correction method according to the third embodiment. In the fine particle diameter correction method of the present embodiment, the computer 312, by executing the program, calculates the respective particle diameters based on the cross-sectional profiles of the isolated standard fine particles and the isolated fine particles to be measured generated by using the detection signal, and corrects the particle diameters of the isolated fine particles to be measured by using the particle diameters of the isolated standard fine particles.

For the cross-sectional profile of the brightness of the standard fine particles 139 and the fine particles to be measured 140 obtained in FIGS. 11A and 11B, as shown in a left side and a right side of FIGS. 12A and 12B, the cross-sectional profile has a peak of the lightness around the fine particles, and the lightness decreases at the center.

As shown in the left side of FIG. 12A, in an example of such an SEM image analysis method, a maximum value and a minimum value are obtained at an outer periphery of the cross-sectional profile, and a particle diameter of the fine particles is obtained by defining an intersection of the lightness and the cross-sectional profile, which shows a certain ratio (50% in the figure), as an external position of the fine particles. The particle diameters of the standard fine particles 139 and the fine particles to be measured 140 obtained as above are respectively 164.2 nm and 103.1 nm in FIG. 12A. Since it is known that the average particle diameter of the standard fine particles 139 of the third embodiment is 154.0 nm, under this condition, assuming that 154 nm is observed to be 164.2 nm, the fine particle diameter of the fine particles to be measured 140 is corrected to 103.1 nm×0.938=96.7 nm by the calculation of the computer 312. Similarly, under the condition of FIG. 12B, the fine particle diameters of the standard fine particles 139 and the fine particles to be measured 140 are respectively obtained to be 147.7 nm and 92.2 nm, similarly to FIG. 12A, the fine particle diameter of the fine particles to be measured 140 is corrected to 92.2 nm×1.043=96.1 nm.

Since standard deviation (distribution) of the fine particle diameter of the standard fine particles 139 can be reduced to about 2 to 3 nm, a measurement error when using the correction method of the present embodiment can be reduced to about 3 nm. Further, in the present embodiment, the correction is performed by using a measurement value of one standard fine particle, but since errors due to the standard deviation of the fine particle diameter of the standard fine particles can be further reduced by performing statistical processing that uses the measurement values of a plurality of standard fine particles, the measurement error of the present embodiment can be improved to about 1 nm.

Furthermore, by evaluating this correction method under various observation conditions of the charged particle beam microscope such as the SEM, scale correction of an image obtained by the microscope can be performed. That is, it is possible to provide a particle measuring device that can perform the scale correction on an image in the particle measuring device by using a measurement result of the isolated standard fine particles disposed in the vicinity of the isolated fine particles to be measured by the computer.

By using a method of automatically spreading the standard fine particles and the fine particles to be measured on the substrate described in the second embodiment, automatic measurement is performed by the charged particle beam microscope, and further, by using the method of correcting the particle diameter according to the present embodiment, the particle diameter of the fine particles to be measured can be accurately measured without strictly adjusting microscope observation conditions.

Furthermore, since the standard fine particles and the fine particles to be measured exist in the vicinity of the image of the charged particle beam microscope, the observation conditions of the charged particle beam microscope can be easily adjusted. Astigmatism in an electron microscope occurs due to asymmetry of a magnetic field caused by an axis deviation of an electron optical system, a charge-up of contamination formed by an electron beam, and the like. The astigmatism is corrected by adjusting an exciting current of an astigmatism corrector that forms an asymmetric magnetic field, so that quality of the obtained image of the electron microscope is improved. Therefore, by using the standard fine particles that can be regarded as a true sphere, the axis deviation and the asymmetry of the magnetic field can be easily adjusted, and the astigmatism of the image obtained by the microscope can be corrected. That is, it is possible to provide a particle measuring device that can perform an astigmatism correction on an image in the particle measuring device by using a measurement result of the isolated standard fine particles disposed in the vicinity of the isolated fine particles to be measured by the computer.

In addition, the particle measuring device has an SEM configuration with attached EDX (energy dispersive X-ray analysis), and by using standard fine particles containing standard samples for EDX or a plurality of types of standard fine particles that contain components (constituent elements) of the fine particles to be measured in a known ratio, absolute values of the constituent elements that are components of the fine particles to be measured from an EDX signal of the standard fine particles can be accurately determined. That is, the particle measuring device has the SEM configuration with the attached EDX, and the isolated standard fine particles are used as a standard sample for EDX, so that it is possible to provide a particle measuring device capable of performing an composition absolute value analysis of the fine particles to be measured by using the measurement result of the isolated standard fine particles for EDX disposed in the vicinity of the fine particles to be measured.

The invention is not limited to the embodiments described above and includes various modifications. For example, the embodiments described above have been described in detail for easy understanding of the invention, and the invention is not necessarily limited to those including all of the configurations described above. A part of a configuration of one embodiment can be replaced with a configuration of another embodiment, and the configuration of another embodiment can be added to the configuration of one embodiment. In addition, a part of the configuration of one embodiment may be added, deleted, or replaced with another configuration.

INDUSTRIAL APPLICABILITY

The invention is effective for measuring a particle diameter and particle diameter distribution of powders in general, and especially for measuring fine particles of 1000 nm or less.

REFERENCE SIGN LIST

101: Substrate
102-A to 102-D: Substrate region modified by surface modification A to D
103: Surface-modified separation band
104, 111, 136: Substrate
112: Surface modification
113: Solution
114-1, 114-2: Liquid surface
115: Fine particle
116: Fine particles that move to outer side of droplet
117, 119: Ring-shaped deposition of fine particles
118: Surface-modified substrate after droplets are dried
121: Surface-modified substrate kit
122: Sample container
123: Lid
124: Inclining table
125: Fine particle (silver)
126: Polygonal line
127: Bar graph
131: Scanning electron microscope body
132: Sample introduction tank
133: Fine particle spreading tank
134, 135, 155, 156: Vacuum valve
136: Substrate
137: Sample stage and Sample transport mechanism
138: Fine particle suspension dropping device 139: PSL fine particle example
140: Gold fine particle example
141: Measurement screen
142: Measurement scanning line
143-1 to 143-7: Standard fine particle with arrangement of being separated by particle unit (isolated standard fine particle)
144-1 to 144-7: Fine particles to be measured with arrangement of being separated by particle unit (isolated fine particles to be measured)
145-1 to 145-2: Standard fine particle with aggregated arrangement (standard fine particle cluster)
146-1: Fine particles to be measured with aggregated arrangement (cluster of fine particles to be measured)
302: Electron gun
303: Electron beam
304: Focusing lens
305: Deflector
306: Objective lens
309: Secondary electron
310: Detector
311: Control system
312: Computer
313: Storage device
314: Monitor
315: Screen

The invention claimed is:

1. A particle measuring device using a scanning electron microscope, the particle measuring device comprising:
a scanning electron microscope body including a detector configured to detect secondary charged particles obtained by scanning a surface of a substrate on which an isolated fine particle to be measured and an isolated standard fine particle in the vicinity thereof are disposed with an electron beam probe; and
a processing unit configured to process a detection signal of the detector and generate an image of the isolated fine particle to be measured and the isolated standard fine particle, wherein
the processing unit corrects a shape of the isolated fine particle to be measured by using a measurement result of the isolated standard fine particle disposed in the vicinity of the isolated fine particle to be measured.

2. The particle measuring device according to claim 1, wherein
the substrate is a surface-modified substrate whose surface is modified by a functional group having a chemical or physical interaction.

3. The particle measuring device according to claim 2, wherein
the surface-modified substrate has a plurality of regions modified with a plurality of functional groups respectively.

4. The particle measuring device according to claim 1, wherein
the processing unit calculates respective particle diameters based on a cross-sectional profile of the isolated standard fine particle and the isolated fine particle to be measured generated by using the detection signal, and corrects the particle diameter of the isolated fine particle to be measured using the particle diameter of the isolated standard fine particle.

5. The particle measuring device according to claim 1, wherein
the processing unit performs a scale correction on the image by using the measurement result of the isolated standard fine particle disposed in the vicinity of the isolated fine particle to be measured.

6. The particle measuring device according to claim 1, wherein
the processing unit performs an astigmatism correction on the image by using the measurement result of the isolated standard fine particle disposed in the vicinity of the isolated fine particle to be measured.

7. The particle measuring device according to claim 1, wherein
the isolated standard fine particle is a standard sample for energy dispersive X-ray analysis, and
the processing unit performs a composition absolute value analysis of the isolated fine particle to be measured by using the measurement result of the isolated standard fine particle disposed in the vicinity of the isolated fine particle to be measured.

8. The particle measuring device according to claim 1, further comprising:
a fine particle spreading tank provided at a sample introduction port of the scanning electron microscope body, wherein
the substrate on which the isolated fine particle to be measured and the isolated standard fine particle in the vicinity thereof are disposed is prepared in the fine particle spreading tank, and the prepared substrate is introduced from the sample introduction port into the scanning electron microscope body.

9. The particle measuring device according to claim 8, wherein
the fine particle spreading tank includes a fine particle suspension dropping device having an electric micropipette.

10. The particle measuring device according to claim 8, wherein
the fine particle spreading tank includes a fine particle suspension dropping device having a pulse valve.

11. A particle measuring method performed by a scanning electron microscope with a processing unit, the particle measuring method comprising:
processing a detection signal of detecting secondary charged particles obtained by scanning a surface of a substrate on which an isolated fine particle to be measured and an isolated standard fine particle in the vicinity thereof are disposed with an electron beam probe of the scanning electron microscope, and generating an image of the isolated fine particle to be measured and the isolated standard fine particle, and
correcting a shape of the isolated fine particle to be measured by using a measurement result of the isolated standard fine particle disposed in the vicinity of the isolated fine particle to be measured.

12. The particle measuring method according to claim 11, wherein
the processing unit calculates respective particle diameters based on a cross-sectional profile of the isolated standard fine particle and the isolated fine particle to be measured generated by using the detection signal, and corrects the particle diameter of the isolated fine particle to be measured by using the particle diameter of the isolated standard fine particle.

13. The particle measuring method according to claim 11, wherein
the processing unit performs a scale correction or an astigmatism correction on the image by using the measurement result of the isolated standard fine particle disposed in the vicinity of the isolated fine particle to be measured.

14. The particle measuring method according to claim 11, wherein the isolated standard fine particle is a standard sample for energy dispersive X-ray analysis, and the processing unit performs a composition absolute value analysis of the isolated fine particle to be measured by using the measurement result of the isolated standard fine particle disposed in the vicinity of the isolated fine particle to be measured.

15. The particle measuring method according to claim 11, wherein the scanning electron microscope has a fine particle spreading tank provided at a sample introduction port, the particle measuring method comprising:

a first step of preparing, in the fine particle spreading tank, a substrate on which the isolated fine particle to be measured and the isolated standard fine particle in the vicinity thereof are disposed, and introducing the prepared substrate into a microscope body of the scanning electron microscope;

a second step of measuring the isolated fine particle to be measured and the isolated standard fine particle disposed on the substrate using the electron beam probe; and a third step of correcting a shape of the isolated fine particle to be measured by using a measurement result of the isolated standard fine particle obtained in the second step.

* * * * *